(12) United States Patent
    Antypas

(10) Patent No.: US 12,565,299 B2
(45) Date of Patent: Mar. 3, 2026

(54) AIR INLET DEVICE COMPRISING AT LEAST ONE HELICAL PARTITION AND AIRCRAFT COMPRISING AT LEAST ONE AIR INLET DEVICE OF THIS KIND

(71) Applicant: Airbus Operations (S.A.S.), Toulouse (FR)

(72) Inventor: Jérôme Antypas, Toulouse (FR)

(73) Assignee: Airbus Operations (S.A.S.), Toulouse (FR)

( * ) Notice: Subject to any disclaimer, the term of this patent is extended or adjusted under 35 U.S.C. 154(b) by 0 days.

(21) Appl. No.: 19/220,744

(22) Filed: May 28, 2025

(65) Prior Publication Data

US 2025/0368309 A1      Dec. 4, 2025

(30) Foreign Application Priority Data

May 30, 2024    (FR) .................................. FR2405598

(51) Int. Cl.
    B64C 1/00          (2006.01)
(52) U.S. Cl.
    CPC ........ B64C 1/0009 (2013.01); B64C 2230/14 (2013.01)
(58) Field of Classification Search
    CPC .............. B64C 23/065; B64C 2230/14; B64C 2230/24; B64D 2033/0226; B64D 2241/00
    See application file for complete search history.

(56) References Cited

U.S. PATENT DOCUMENTS

| | | | | |
|---|---|---|---|---|
| 3,525,486 | A | 8/1970 | Wimpenny | |
| 3,596,854 | A * | 8/1971 | Haney, Jr. ............. | B64C 23/065 |
| | | | | 244/199.3 |
| 4,222,231 | A | 9/1980 | Linn | |
| 4,362,280 | A * | 12/1982 | McCambridge | ........ B64C 39/02 |
| | | | | 244/3 |
| 11,396,367 | B2 * | 7/2022 | Walliser | ............... B64C 23/065 |
| 2011/0103969 | A1 | 5/2011 | Sheaf et al. | |

FOREIGN PATENT DOCUMENTS

| | | | | |
|---|---|---|---|---|
| CA | 2890773 | C  * | 6/2017 | ............. B64D 13/06 |
| EP | 2853727 | A1 | 4/2015 | |
| FR | 1153298 | A | 3/1958 | |

OTHER PUBLICATIONS

French Search Report in FR Application No. 2405598, dated Oct. 24, 2024, 2 pages.

* cited by examiner

*Primary Examiner* — Richard Green
(74) *Attorney, Agent, or Firm* — KDW Firm PLLC

(57) ABSTRACT

An air inlet device includes an inlet duct, a valve and at least one helical partition positioned within the inlet duct, the helical partition having an outer edge in contact with the inlet duct and delimiting at least one helical duct within the inlet duct. The helical partition serves to increase the distance travelled by an air flow entering the inlet duct before it reaches the valve in the closed state. An aircraft including at least one air inlet device of this kind is disclosed.

10 Claims, 8 Drawing Sheets

AIR INLET DEVICE COMPRISING AT LEAST ONE HELICAL PARTITION AND AIRCRAFT COMPRISING AT LEAST ONE AIR INLET DEVICE OF THIS KIND

TECHNICAL FIELD

The subject matter herein relates to an air inlet device comprising at least one helical partition, and to an aircraft comprising at least one air inlet device of this kind.

BACKGROUND

According to one embodiment, an aircraft 10 comprises a fuselage 12, wings 14 provided on either side of the fuselage 12, and propulsion assemblies 16 connected to the wings via pylons 18. The aircraft 10 comprises at least one air inlet device 20 that can be seen in FIG. 2 and that opens out at an aerodynamic surface 22 that is in contact with an air flow 24 when the aircraft 10 is in flight. This air inlet device 20 is configured to capture a portion of the air flow 24 and direct it towards an on-board system of the aircraft. The aerodynamic surface 22 may be provided on the fuselage 12, a wing 14, a propulsion assembly 16 or a pylon 18.

According to one configuration, the air inlet device 20 comprises an inlet duct 26 that extends between a first end 26.1 connected to the aerodynamic surface 22 and a second end 26.2, and a valve 28 connected to the second end 26.2 of the inlet duct 26 and configured to occupy an open state in which the valve 28 allows an air flow conveyed by the inlet duct 26 to pass through it, and a closed state in which the valve 28 blocks the air flow in the inlet duct 26.

According to one configuration, the first end 26.1, which opens out at the aerodynamic surface 22, is flared and forms a flush-type air intake.

The air inlet device 20 is optimized to reduce the drag of the aircraft when the valve 28 is in the open state.

When the valve 28 is in the closed state, the inlet duct 26 and the closed valve 28 form a cavity 30, shown schematically in FIG. 3, which opens out at the aerodynamic surface 22. The air flow 24 passing above the cavity 30 generates a vibro-acoustic phenomenon with a frequency in the order of 200 Hz which results in aerodynamic noise.

SUMMARY

The disclosure herein aims to overcome all or some of the drawbacks of the prior art.

To this end, the disclosure herein relates to an air inlet device comprising an inlet duct that extends between a first end intended to open out at an aerodynamic surface and a second end, as well as a valve connected to the second end of the inlet duct.

According to the disclosure herein, the air inlet device comprises at least one helical partition positioned within the inlet duct, having an outer edge in contact with the inlet duct and delimiting at least one helical duct within the inlet duct.

The helical partition serves to increase the distance travelled by an air flow entering the inlet duct before it reaches the valve in the closed state, which reduces the resonance frequency of the air flow entering the inlet duct and, ultimately, reduces noise emissions.

According to another feature, the air inlet device comprises an axial support about which each helical partition is wound.

According to another feature, each helical partition is connected to the axial support and/or to the inlet duct in a sealing manner.

According to another feature, the inlet duct comprises at least a first section delimited by a substantially cylindrical tubular wall that extends from the second end of the inlet duct and has an axis of revolution.

According to another feature, each helical partition is positioned within the first section of the inlet duct and has a length substantially equal to that of the first section.

According to another feature, the axial support is a cylindrical rod having an axis coincident with the axis of revolution of the tubular wall, the axial support having a length greater than or equal to that of the first section of the inlet duct.

According to another feature, the air inlet device comprises a plurality of helical partitions.

According to another feature, the helical partitions have the same winding direction, the same pitch and are spaced from one another by the same spacing.

According to another feature, the air inlet device comprises two helical partitions, each having an upstream edge located at the first end of the inlet duct or closest thereto, the upstream edges of the two helical partitions being aligned.

The disclosure herein also relates to an aircraft comprising at least one aerodynamic surface and an air inlet device according to any one of the preceding features, which opens out at the aerodynamic surface.

BRIEF DESCRIPTION OF THE DRAWINGS

Other features and advantages will become apparent from the following description of the disclosure herein which is provided solely by way of example, with reference to the attached drawings, in which.

DETAILED DESCRIPTION

Figure 1:
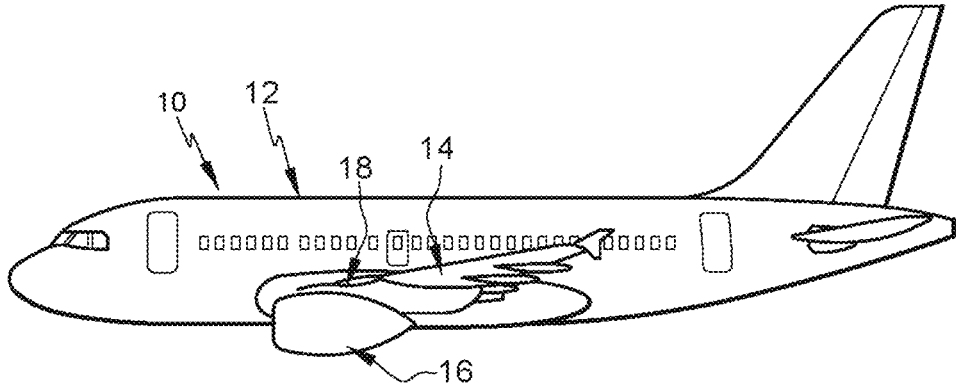
FIG. 1 is a side view of an aircraft.
Figure 2:
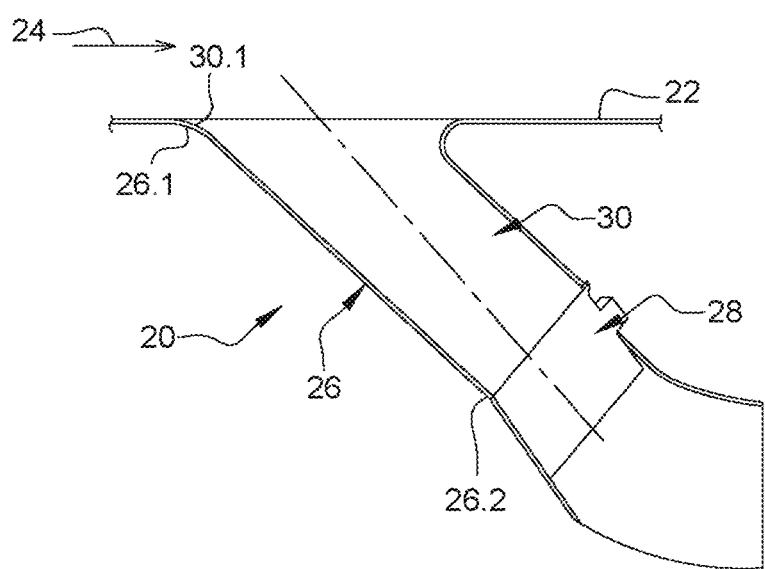
FIG. 2 is a longitudinal section of an air inlet device illustrating an embodiment from the prior art.
Figure 3:
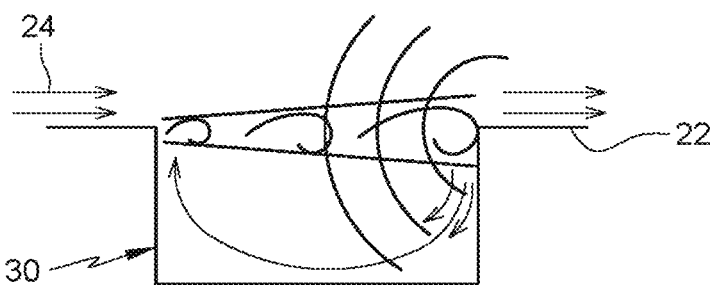
FIG. 3 is a schematic representation of the air inlet device shown in FIG. 2, forming a cavity and illustrating air flows circulating above and within the cavity.
Figure 4:
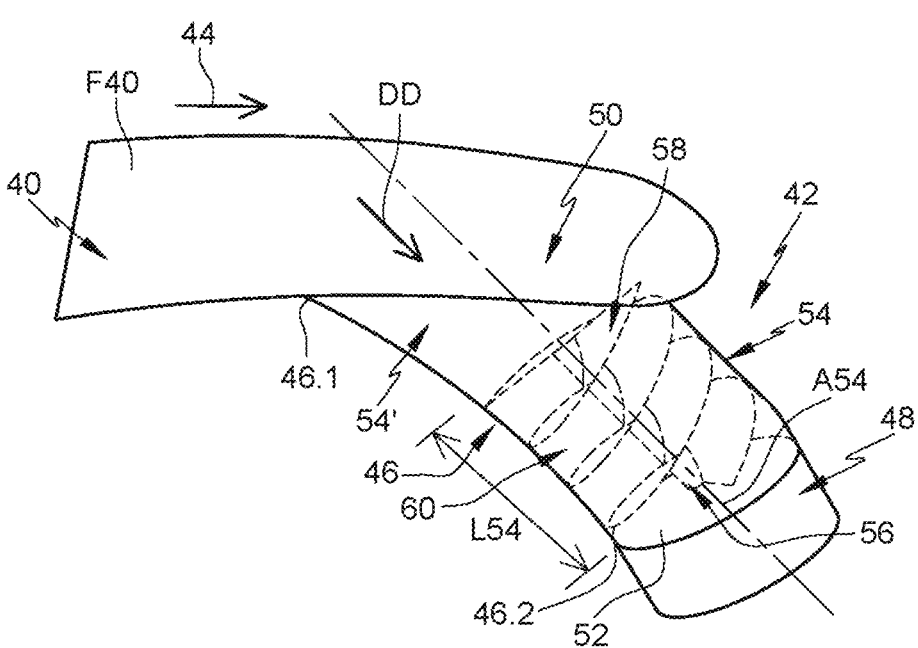
FIG. 4 is a side view of an air inlet device comprising a helical partition illustrating one embodiment of the disclosure herein.
Figure 5:
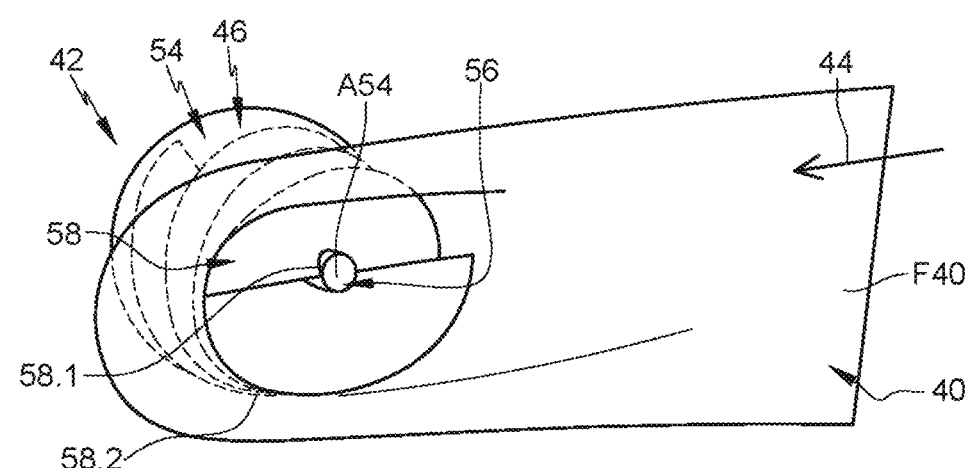
FIG. 5 is a top view of the air inlet device shown in FIG. 4.
Figure 6:
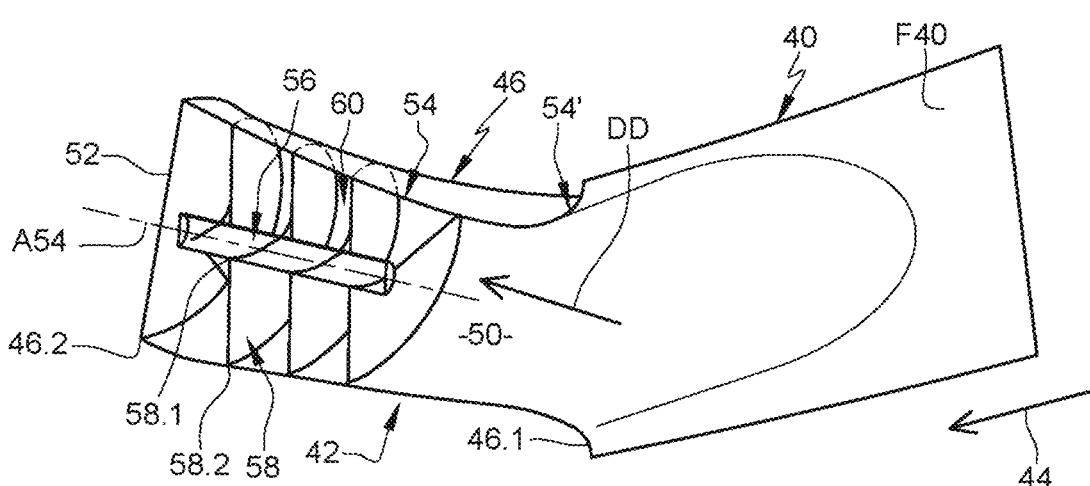
FIG. 6 is a longitudinal section of the air inlet device shown in FIG. 4.

According to one embodiment shown in FIG. 4, an aircraft comprises at least one aerodynamic surface 40 and at least one air inlet device 42.

The aerodynamic surface 40 has an outer face F40 over which an air flow 44 flows in a flow direction when the aircraft is in flight. The aerodynamic surface 40 may be provided on the fuselage, a wing, a propulsion assembly or a pylon of the aircraft.

Although described in the context of an aircraft, the disclosure herein is not limited to this application. The air inlet device 42 may equip any type of vehicle and open out at an aerodynamic surface of a vehicle.

The air inlet device 42 comprises an inlet duct 46 which extends between a first end 46.1, also referred to as an air intake, connected to the aerodynamic surface 40, and a second end 46.2, and a valve 48 connected to the second end 46.2 of the inlet duct 46 and configured to occupy an open state in which the valve 48 allows an air flow conveyed by the inlet duct 46 to pass through it, and a closed state in which the valve 48 blocks the air flow in the inlet duct 46.

According to one configuration, the first end 46.1, which forms the air intake of the inlet duct 46, opens out at the aerodynamic surface 40 and is flared in the direction of the outer face F40 of the aerodynamic surface 40. According to this configuration, the first end 46.1 of the inlet duct 46 forms a flush-type air intake.

When the valve 48 is in the closed state, the inlet duct 46 and the valve 48 in the closed state form a cavity 50 which opens out at the aerodynamic surface 40.

This cavity 50 is delimited by the inlet duct 46 and a bottom 52 (corresponding to the valve 48 in the closed state) that is spaced apart from the aerodynamic surface 40.

In the case of a flush-type air intake, the inlet duct 46 comprises a first section delimited by a substantially cylindrical tubular wall 54 that extends from the second end 46.2 of the inlet duct 46, and a second section delimited by a flared connecting wall 54' connecting the tubular wall 54 and the aerodynamic surface 40.

The tubular wall 54 has an axis of revolution A54 that is substantially parallel to an intake direction DD, which may be perpendicular or inclined relative to the outer face F40 of the aerodynamic surface 40. By way of example, the reference direction DD forms an angle of approximately 60° with the outer face F40 of the aerodynamic surface 40.

According to one arrangement, the bottom 52 is substantially perpendicular to the reference direction DD and to the axis of revolution A54.

Figure 8:
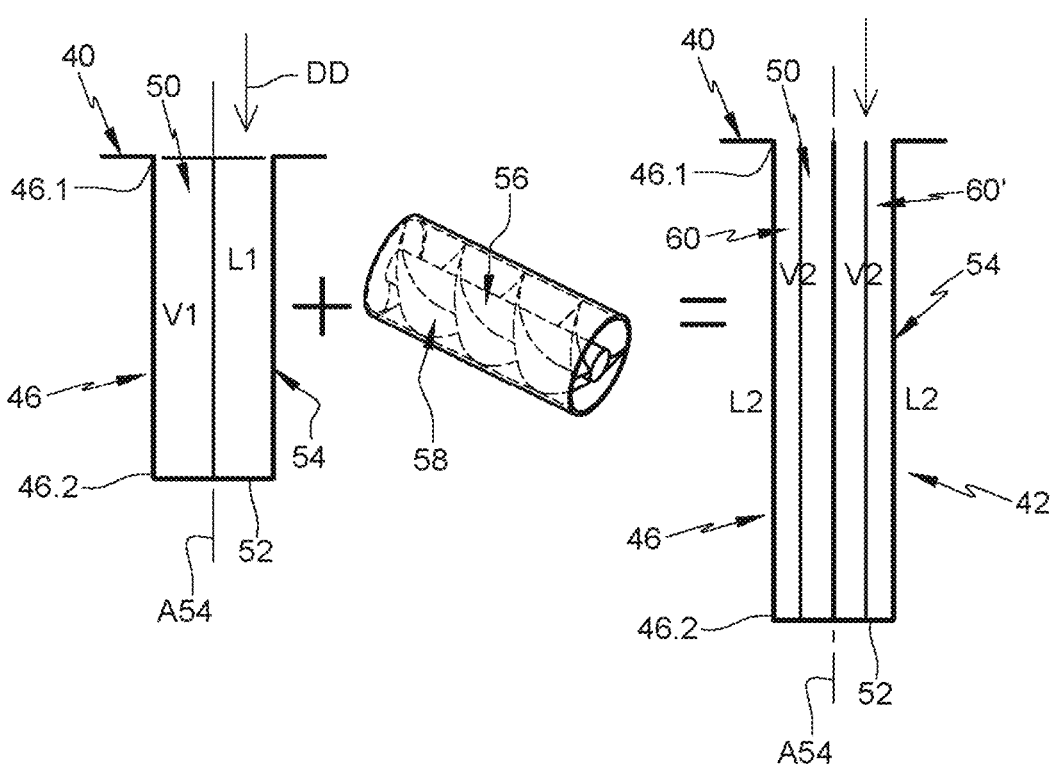
FIG. 8 is a schematic representation of an air inlet duct, a helical partition and an air inlet duct equipped with a helical partition illustrating one embodiment of the disclosure herein.

As illustrated in FIG. 8, the inlet duct 46 has a depth L1 corresponding to a distance measured along the axis of revolution A54 between a surface containing the outer face F40 of the aerodynamic surface 40 and the bottom 52, as well as a volume V1. The first section of the inlet duct 46 delimited by the tubular wall 54 has a length L54.

According to a simplified schematic representation shown in FIG. 8, the inlet duct 46 comprises only a first section directly connected to the aerodynamic surface 40 and does not comprise a connecting wall 54'. In addition, the axis of revolution A54 of the tubular wall 54 is substantially perpendicular to the outer face F40 of the aerodynamic surface 40. In this case, the depth L1 is substantially equal to the length L54 of the tubular wall 54.

When the axis A54 is inclined relative to the normal to the outer face F40, as illustrated in FIG. 4, the inlet duct 46 may comprise two sections delimited by a tubular wall 54 and a connecting wall 54'. In this case, the depth L1 is greater than the length L54.

The disclosure herein is of course not limited to these embodiments of the air inlet device. Whatever the embodiment, the air inlet device 42 comprises an inlet duct 46 that extends between a first end 46.1 that opens out at an aerodynamic surface 40 and a second end 46.2, and a valve 48 connected to the second end 46.2 of the inlet duct 46 and configured to occupy an open state in which the valve 48 allows an air flow conveyed by the inlet duct 46 to pass through it, and a closed state in which the valve 48 blocks the air flow in the inlet duct 46. According to a preferred embodiment, the inlet duct 46 comprises at least a first section delimited by a substantially cylindrical tubular wall 54 that extends from the second end 46.2 of the inlet duct 46 and has an axis of revolution A54.

According to a particular feature of the disclosure herein, the air inlet device 42 comprises an axial support 56 positioned along the axis of revolution A54 of the tubular wall 54 of the inlet duct 46, and at least one helical partition 58 positioned around the axial support 56 and extending between an inner edge 58.1 connected to the axial support 56 and an outer edge 58.2 adjacent to the inlet duct 46. This helical partition 58 serves to increase the distance travelled by an air flow entering the inlet duct 46 before it reaches the bottom 52, thereby reducing the resonance frequency of the air flow entering the inlet duct 46 and ultimately reducing noise emissions.

According to one configuration, the axial support 56 has a length greater than or equal to the length L54 of the first section of the inlet duct 46 delimited by the tubular wall 54.

According to one embodiment, the axial support 56 is a cylindrical rod that has an axis coinciding with the axis of revolution A54 of the tubular wall 54.

According to one configuration, each helical partition 58 is sealingly connected to the axial support 56 and/or to the inlet duct 46. Each helical partition 58 extends within the first section of the inlet duct 46 delimited by the tubular wall 54 and has a length substantially equal to that of the first section. In a variant, at least one helical partition 58 extends into the second section of the inlet duct 46 delimited by the flared connecting wall 54'.

Figure 7:
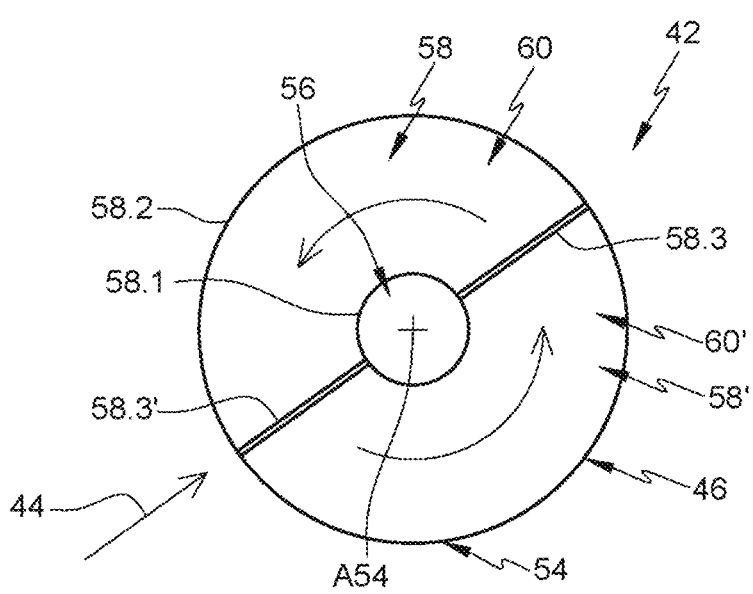
FIG. 7 is a top view of an air inlet device comprising two helical partitions which illustrates one embodiment of the disclosure herein.

According to one embodiment, shown in particular in FIG. 7, the air inlet device 42 comprises multiple helical partitions 58, 58'. These partitions have the same winding direction around the same axial support 56, the same pitch and are spaced from one another by the same spacing.

According to a configuration shown in FIG. 7, the air inlet device 42 comprises two helical partitions 58, 58' that divide the inlet duct 46 into two helical ducts 60, 60'. As schematically illustrated in FIG. 8, the two helical ducts 60, 60' have substantially identical lengths L2 which are clearly greater than the depth L1 of the cavity 50, as well as substantially identical volumes V2, each volume V2 being substantially equal to half the volume V1 of the cavity 50.

Each helical partition 58, 58' has an upstream edge 58.3, 58.3' connecting the inner and outer edges 58.1, 58.2, located at the first end 46.1 or closest thereto.

According to one arrangement, each upstream edge 58.3, 58.3' is substantially parallel to the flow direction of the air flow 44 flowing over the outer face F40 of the aerodynamic surface 40. When the air inlet device 42 comprises two helical partitions 58, their upstream edges 58.3, 58.3' are aligned and substantially parallel to the flow direction of the air flow 44 flowing over the outer face F40 of the aerodynamic surface 40.

Each helical partition 58, 58' is wound in a winding direction around the axial support 56. According to a first variant, the winding direction of each helical partition 58, 58' is clockwise. According to a second variant, the winding direction of each helical partition 58, 58' is anti-clockwise.

Whatever the embodiment, the air inlet device comprises at least one helical partition 58, 58' that has an outer edge 58.2 in contact with the inlet duct 46, the helical partition 58, 58' being configured to delimit within the inlet duct 46 at least one helical duct 60, 60'. The duct has a length L2, a volume V2, and a passage cross-section S2.

It is possible to adjust the length L2 of the helical ducts 60, 60' by modifying the pitch of the helical partitions 58, 58'. Hence, the smaller the pitch of the helical partitions 58, 58', the greater the length L2 of the helical ducts 60, 60', and the lower the resulting resonance frequency.

It is also possible to adjust the volume V2 and the passage cross-section S2 of the helical ducts 60, 60' by modifying the number of helical partitions 58, 58'. Accordingly, the greater the number of helical partitions 58, 58', the smaller the volume V2 and the passage cross-section S2 of each helical duct 60, 60', and the lower the resulting resonance frequency.

Hence, it is possible to tune the resonance frequency of an air inlet device 42 by adjusting at least one parameter from among: the number of helical partitions 58, 58', the pitch of each helical partition 58, 58', the winding direction of each helical partition 58, 58' and the geometry of each helical partition 58, 58' at the first end 46.1 (corresponding to the inlet of the inlet duct 46).

While at least one example embodiment of the invention(s) is disclosed herein, it should be understood that modifications, substitutions, and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An aircraft comprising:
an aerodynamic surface;
an aircraft system; and
an air inlet device configured to deliver ambient air from outside the aircraft to the aircraft system, the air inlet device comprising:
an inlet duct comprising and extending between a first end, which opens to atmosphere at an aerodynamic surface, and a second end, through which air is provided to the aircraft system;
a valve connected to the second end of the inlet duct; and
at least one helical partition that is positioned in the inlet duct and comprises an outer edge in contact with the inlet duct;
wherein the at least one helical partition delimits at least one helical duct within the inlet duct, such that a distance travelled by an air flow entering the inlet duct is increased; and
wherein the inlet duct and the valve form a cavity when the valve is in a closed state.

2. The aircraft of claim 1, wherein the air inlet device comprises an axial support about which each helical partition is wound.

3. The aircraft of claim 2, wherein each helical partition is connected to the axial support and/or to the inlet duct in a sealing manner.

4. The aircraft of claim 2, wherein the inlet duct comprises at least a first section delimited by a substantially cylindrical tubular wall that extends from the second end of the inlet duct and has an axis of revolution.

5. The aircraft of claim 4, wherein each helical partition is positioned within the first section of the inlet duct and has a length substantially equal to a length of the first section.

6. The aircraft of claim 4, wherein the axial support is a cylindrical rod having an axis coincident with the axis of revolution of the tubular wall, the axial support having a length greater than or equal to that of the first section of the inlet duct.

7. The aircraft of claim 1, wherein the air inlet device comprises a plurality of helical partitions.

8. The aircraft of claim 7, wherein the helical partitions have a same winding direction, a same pitch and are spaced from one another by a same spacing.

9. The aircraft of claim 7, wherein the air inlet device comprises two helical partitions, each of the two helical portions having an upstream edge located at the first end of the inlet duct or closest thereto, the upstream edges of the two helical partitions being aligned.

10. The aircraft of claim 9, wherein the upstream edges of the two helical portions are aligned coplanar with each other.

* * * * *